Nov. 17, 1959 R. HEIDECKE ET AL 2,912,912
FOCUSING HOOD FOR PHOTOGRAPHIC CAMERAS
Filed March 25, 1955 5 Sheets-Sheet 1

Nov. 17, 1959 R. HEIDECKE ET AL 2,912,912
FOCUSING HOOD FOR PHOTOGRAPHIC CAMERAS
Filed March 25, 1955 5 Sheets-Sheet 2

Nov. 17, 1959  R. HEIDECKE ET AL  2,912,912
FOCUSING HOOD FOR PHOTOGRAPHIC CAMERAS
Filed March 25, 1955  5 Sheets-Sheet 3

Nov. 17, 1959   R. HEIDECKE ET AL   2,912,912
FOCUSING HOOD FOR PHOTOGRAPHIC CAMERAS
Filed March 25, 1955   5 Sheets-Sheet 4

Nov. 17, 1959   R. HEIDECKE ET AL   2,912,912
FOCUSING HOOD FOR PHOTOGRAPHIC CAMERAS
Filed March 25, 1955   5 Sheets-Sheet 5

United States Patent Office 2,912,912
Patented Nov. 17, 1959

2,912,912
FOCUSING HOOD FOR PHOTOGRAPHIC CAMERAS

Reinhold Heidecke, Hermann Bretthauer, and Joachim Mädge, Braunschweig, Germany, assignors to Franke & Heidecke, Fabrik Photographischer Prazisions-Apparate, Braunschweig, Germany, a firm of Germany Application March 25, 1955, Serial No. 496,658

Claims priority, application Germany April 3, 1954

3 Claims. (Cl. 95—47)

The invention relates to a focusing or light hood for shielding the focusing or viewing screen of photographic reflex cameras from direct light sources.

An object of this invention is to provide a generally improved and more satisfactory focusing hood.

Another object is to provide a focusing hood adapted to be collapsed into a compact unit on the camera housing with one wall of the hood forming a protective cover for the camera viewing screen and the parts of the focusing hood itself.

Still another object is to provide a focusing hood for a photographic reflex camera which is adapted to be disposed in a collapsed position on the camera housing, with none of the parts of the focusing hood entering into the housing itself.

A further object is to provide a more compact collapsible focusing hood having a plurality of interconnected walls adapted to be moved concomitantly into an expanded or collapsed position in a specific sequence as one of the walls of the hood is moved.

A still further object of the invention is to provide a collapsible focusing hood having a plurality of walls acted upon by lost motion connecting means whereby movement of one wall effects movement of the other walls of the hood in specific and consistent order.

A still further object is to provide a more efficient collapsible focusing hood in which the various walls, when expanded for operation, remain interconnected so that no movement of one wall can occur without producing a like movement of the other walls of the hood.

A still further object is to provide a focusing hood in which the parts may be adjusted to maintain their desired sequence of movement even after wear of the parts is occasioned.

A still further object is to provide a focusing hood which is simple in construction and operation, is efficient in use, and adds to the appearance of the photographic camera itself.

These and other desirable objects may be attained in the manner disclosed as an illustrative embodiment of the invention in the following description and in the accompanying drawings forming a part hereof, in which.

The same reference numerals throughout the several views indicate the same parts.

In photographic reflex camera constructions, it is common practice to shield the ground glass focusing screen of the camera from the direct light rays to permit easier viewing of the image formed thereon. The focusing or light hoods conventionally employed for this purpose are of a collapsible construction to protect the focusing screen and parts of the hood itself, and to facilitate easier and more compact storage. One form of known focusing hood, as for example as shown in the German Patent 610,775, issued to Paul Franke et al., is designed to have its walls fold upon each other into a compact unit on the top of the camera itself. However, the sequence of the collapsing movements of the separate walls is often not exactly established or uniform, so that bending or marring of the walls may result. Further, unless special auxiliary locking devices are provided, the side walls of the focusing hood are subject to bending or may even be moved into a collapsed position by strong winds; thus this type of hood has certain limitations in use.

In another form of known focusing hood, shown by the German Patents 616,159 and 637,582, issued to Paul Franke et al., and the German patent to Harris, 103,811, each of the side walls of the focusing hood consists of a number of separate sections interconnected by pin and slot means. With this construction, the parts of the focusing hood are moved into a collapsed or expanded position by movement of one of either of the front or rear walls of the hood. However, to accommodate the side walls of the hood when collapsed, the camera housing itself must be provided with suitable cavities, thus requiring a larger camera housing and a generally complicated construction.

In accordance with the present invention, the above noted objections are eliminated, and there is provided a focusing hood which incorporates a compact collapsing arrangement having a cooperating interengaged wall structure to facilitate concomitant movement of the walls of the hood. When collapsed, the hood is relatively flat, with all walls lying above the ground glass or focusing plate and requiring no wall-receiving slots at the side of the focusing plate, this flat relationship of the collapsed parts being especially advantageous for replacement hoods carried in stock by camera repair stores, because of the smaller storage space required in the stock room.

Figure 1:
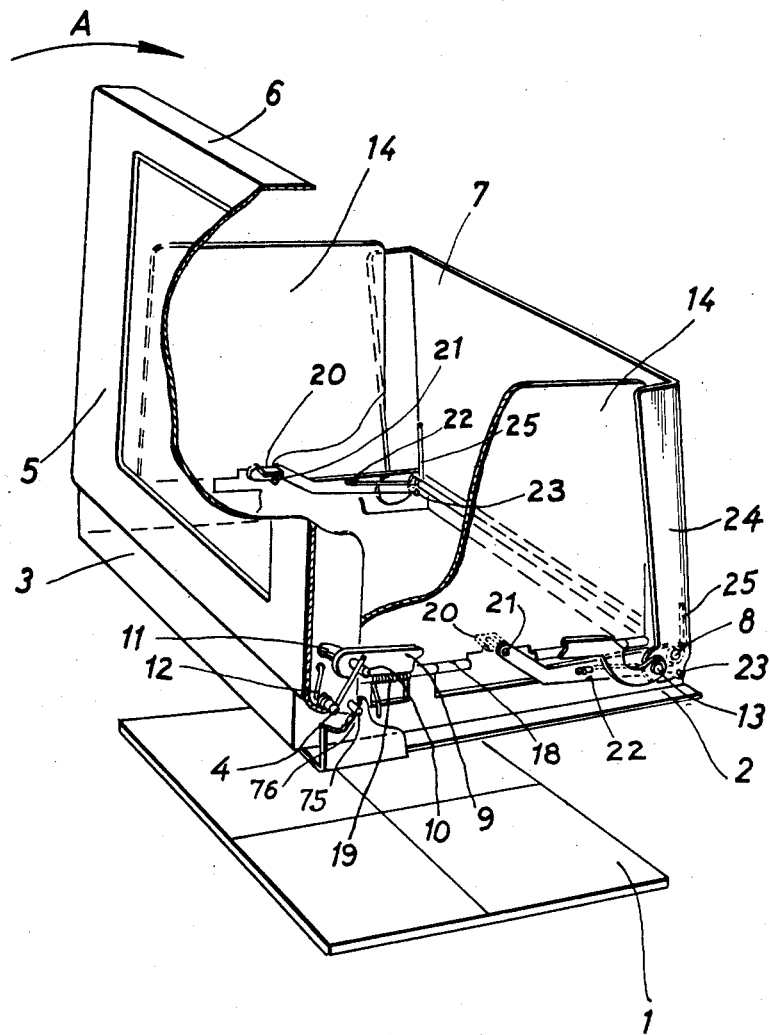
Fig. 1 is a perspective view of one embodiment of the focusing or light hood of the present invention in erected position, with certain of the parts being broken away to illustrate more clearly certain of the constructional details.
Figure 2:
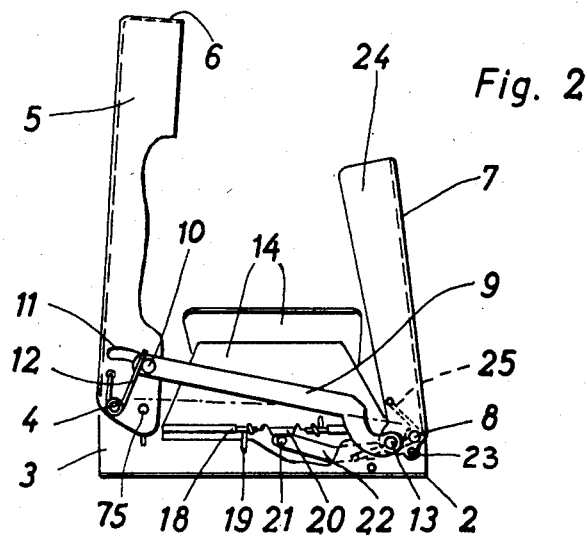
Fig. 2 is a left side elevation of the focusing hood shown in Fig. 1, illustrating the parts in a partially collapsed position, with certain parts being broken away or removed.

With reference to the drawing, the photographic reflex camera itself has been omitted from the drawings, with the exception of its ground glass viewing screen, in order to present a clear and simple illustration of the focusing hood. The hood is designed to be secured to the top of the camera housing, above the ground glass viewing screen 1, by any suitable means, and includes a rectangular frame 2 having a front vertical wall 3. By means of a pivot or hinge rod or bar 4, the front wall 5 of the focusing hood is pivotally mounted on the frame 2. This wall serves as a cap or cover for the camera when the hood is collapsed, and is provided along three of its edges with a flange 6 which serves as a weather and dust seal and adds to the neat camera appearance. A spring, not shown on the drawing, is coiled about the pivot rod 4 and tends to move the wall 5 into an erected position, as shown in Fig. 1, or a closed position, depending upon the position of the wall 5 at the particular time. This spring is of conventional "dead-center" type in which it acts upon the wall 5 only as the wall is brought almost into its erect or collapsed position. Thus, once the wall 4 is in its erect or collapsed position, the "dead-center" spring tends to maintain it in that particular position.

The light hood also includes a rear wall 7 pivotally mounted to the frame 2 by a pivot or hinge rod or bar 8, about which is likewise coiled a "dead-center" type spring (not shown) for maintaining the wall 7 in an erect or collapsed position. To permit concomitant movement of the rear wall 7 as the front wall 5 is moved, a thrust bar or rod 9 is pivoted at one end to the pin 13, carried by the enlarged end portion of the flange 24 of the rear wall 7, while the front end of the bar 9 is provided with a pin 10 adapted to ride along the arcuate slot 11, formed concentrically with the axis of the rod 4. Coiled about the pivot rod 4 is a hairpin spring 12, having one of its ends fixed to the front wall 5, while its other end reacts against the pin 10, forcing it to the rear end of the slot 11 and moving the thrust bar 9 toward the rear of the hood. The spring 12 exerts a force greater than that of the closing reaction produced by the "dead-center" type spring acting on the rear wall 7 of the focusing hood, thus insuring that the pin 10 will be moved to the rear end of the slot 11 when the hood is expanded.

The side walls 14 of the focusing hood are connected by pivot or hinge rods or bars 18 to the side portions of the frame 2, and are each urged into a folded position over the focusing screen 1 by coil springs 19 carried by the bars 18, with their end reacting against the frame 2 and the side walls 14. Approximately centrally of the lower edge of each of the side walls 14 is provided an inwardly directed abutment ear or lug 20, formed either as a struck-out portion from the side wall or a separate piece adjustably secured thereto. Engaging the lugs 20 are pins 21 fixed to the front ends of the arms or levers 22 disposed along the outer surfaces of the side walls 14 and pivotally mounted at their rear ends to the hinge rod 8. Stops or abutments 23, carried by the enlarged flange portion of the rear wall 7, engage with the levers 22 as the wall 7 is moved into erect position, thereby urging the pins 21 against the lugs 20 and causing the side walls to move upwardly until contact is made with the flanges 24 of the rear wall. By attaching the lugs 20 to the side walls 14 as separate elements the user is free to adjust the lugs relative to the pins 21 when needed to maintain the correct sequence of movements of the side walls even after some wear of the parts has been occasioned. To prevent the levers 22 from rattling when the focusing hood is in collapsed position, hairpin springs 25, carried by the pivot bar 8, urge the levers 22 against the stops 23.

Figure 3:
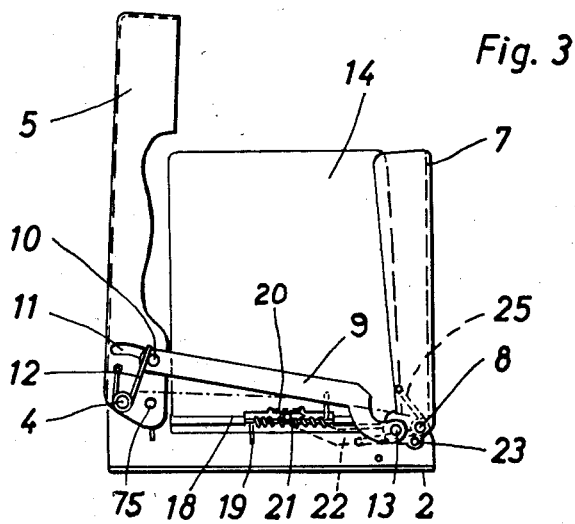
Fig. 3 is a view similar to Fig. 2 showing the focusing hood in its expanded or erected position ready for use.

In use, the focusing hood assumes a position as shown in Figs. 1 and 3, wherein the walls are in erect position, with the stop pin 75, extending outwardly from the flange 6 of the front wall 5, in engagement with the abutment 76 bent outwardly and upwardly from the main body of the frame 2, and with the rear edges of the side walls located inside the side flanges of the rear walls, to limit the outward swinging movements of the side walls. In collapsing the focusing hood, the front wall 5 is moved rearwardly in the direction of the arrow A. With this movement, the thrust bar 9 moves rearwardly, causing the rear wall to commence its folding swing. As the rear wall 7 starts to swing downwardly, the stops 23 are carried upwardly away from the levers 22, thus allowing the levers 22 to move downwardly thereby disengaging their pins 21 from the lugs 20 on the side walls 14. The springs 19 are now free to exert their closing movement on the side walls 14, which are moved into folded position before the front or rear wall makes any contact therewith. Continued movement of the front wall 5 in the direction of the arrow A, causes the link to move further rearwardly, thereby continuing the downward swinging of the rear wall 7 over the now collapsed side walls 14, and the front wall 5 goes down on top of the collapsed rear wall 7. During this movement, the spring 12 flexes and allows the pin 10 of the thrust rod 9 to ride along the arcuate slot 11 until the front wall 5 is moved into a flat covering position, thus providing a lost-motion connection between the parts. In the collapsed position, the focusing hood forms a compact unit on the top of the camera housing, with none of the parts of the hood entering into the housing itself.

It will be noted that the various parts of the focusing hood are so correlated that the specific sequence of movements of the different walls of the hood is such that none of the walls interfere with the movement of any of the other walls. In expanding the hood from its collapsed position the wall 5 is merely moved upwardly about its pivot rod 4, causing the walls to traverse the same paths as above described, but, of course, in a reverse direction and with a reverse sequence.

Figure 4:
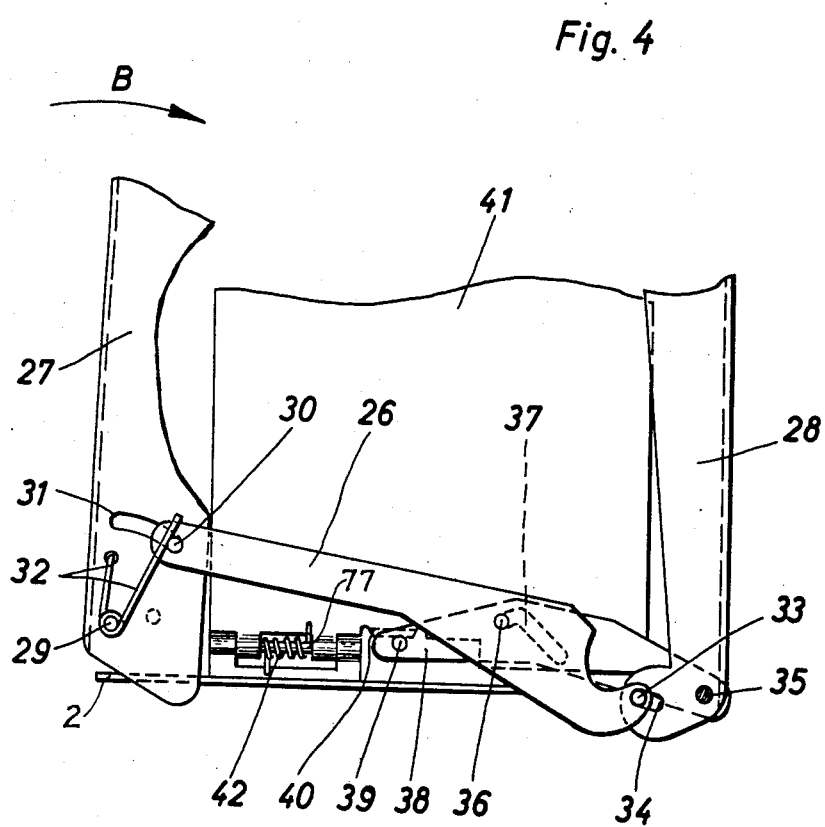
Fig. 4 is a partial side elevation of another embodiment of the invention as it appears in its expanded or erected position ready for use.

In the modification of the invention shown in Fig. 4, the wall construction of the focusing hood and the sequence of movement is generally the same as described above in regard to the first embodiment, with the construction differing primarily in the means for accomplishing the concomitant and correlated movements of the various parts. The front wall 27 of this embodiment is pivotally connected to the front end of the rectangular frame 2 by a hinge or pivot rod or bar 29, while the rear wall 28 is likewise mounted on the opposite end of the frame 2 by a pivot or hinge rod or bar 35. As in the first described modification of the invention, the front and rear walls 27 and 28 are connected by motion transmitting links or thrust bars or rods 26 having pins 30 on their front ends adapted to ride along the arcuate slots 31 formed in the side flanges of the front wall, concentrically with the axis of the rod 29, while their rear ends are provided with pins 33 movable along the slots 34 located in the enlarged portions of the side flanges of the rear wall.

The walls 27 and 28 are influenced by conventional "dead-center" type springs tending to hold them in either fully erected or fully collapsed positions, and the thrust rods 26 are urged rearwardly by coil springs 32 carried by the pivot rod 29 and having their ends reacting against the pins 30 and the side flanges of the front wall 27, in the same manner as in the first embodiment. With the front and rear walls 27 and 28, respectively being maintained in their erect positions by their individual "dead-center" springs, the thrust rods 26 are located as shown in Fig. 1, with the pin 30 being located at the rear end of the slot 31, due to the resilient action of the springs 32, and with the pin 33 at the forward end of its slot 34.

The side walls 41 of the focusing hood are likewise pivotally mounted on the side portions of the frame 2 by hinge or pivot rods or bars 77, and are constantly urged into a folded position over the ground glass viewing screen of the camera by the springs 42, coiled about the rods 77 and reacting against the frame 2 and side walls 41. As in the previously described construction, an inwardly directed ear or lug 40 is provided approximately centrally of the lower edge of each side wall. The lugs 40 are engaged by pins 39 fixed to the front ends of the arms or levers 38, each of which is pivoted to the hinge bar 35 of the rear wall, and is disposed outwardly of the side wall 41 against which it reacts. The levers 38 correspond in general to the levers 22 of the first modification, however in this case movement is imparted to the levers 38 by cam pins 36 projecting from the sides of the thrust rods 26 into the cam slots 37 formed in the adjacent surfaces of the levers 38.

Operation of this second form of focusing hood to move it into a collapsed position from its position shown in Fig. 4 is accomplished by merely moving the front wall 27 in the direction of the arrow B. This movement causes the thrust rods 26 to move rearwardly with their rear pins 33 riding along the slots 34, while their front pins 30 remain in the position shown in Fig. 4, in view of the force of the springs 32 thereagainst. As the thrust rods 26 are urged rearwardly, their pins 36 ride along the cam slots 37 of the levers 38, depressing the same and allowing the springs 42 to swing the side walls 41 toward a folded position. It will be noted that the initial movement of the front wall 27 merely causes the thrust rod to move rearwardly and allow the side walls 41 to collapse, with no initial movement being imparted to the rear wall 28. At about the same time that the pins 36 of the thrust rods 26 reach the high points of their cam slots 37, so that the arms 38 are fully depressed and the side walls 41 are fully collapsed, the pins 33 reach the rear ends of the slots 34, and then further movement of the front wall 27 in a closing direction causes the rear wall 28 to swing downwardly over the side walls 41. As with the previous modification, the springs 32 flex as the wall 27 is moved closer toward its collapsed position, and allow the pins 30 of the thrust bars 26 to move relative to the arcuate slots 31 to their forward ends. This form of the invention, when collapsed, is also compactly nested on top of the camera housing.

As in the previously described form of the invention, expanding the focusing hood for use merely requires an upward force on the front wall 27 about its hinge pin 29, which force is transmitted to the other walls of the structure by means of the thrust rods 26. The various parts of the hood will pass through a specific sequence of movement (the reverse of the movements described above) without any obstruction, and the hood will once again be in erect position. In this position, the side walls 41 are held against the side flanges of the rear wall 28 by the engagement of the pins 39 with the lugs 40. The levers 38 and the thrust rods 26 are held stationary by the springs 32 and by the "dead-center" springs reacting against the front and rear walls, and thus all the walls of the housing are operatively connected so that no one wall can be moved without affecting the position of the others.

Figure 5:
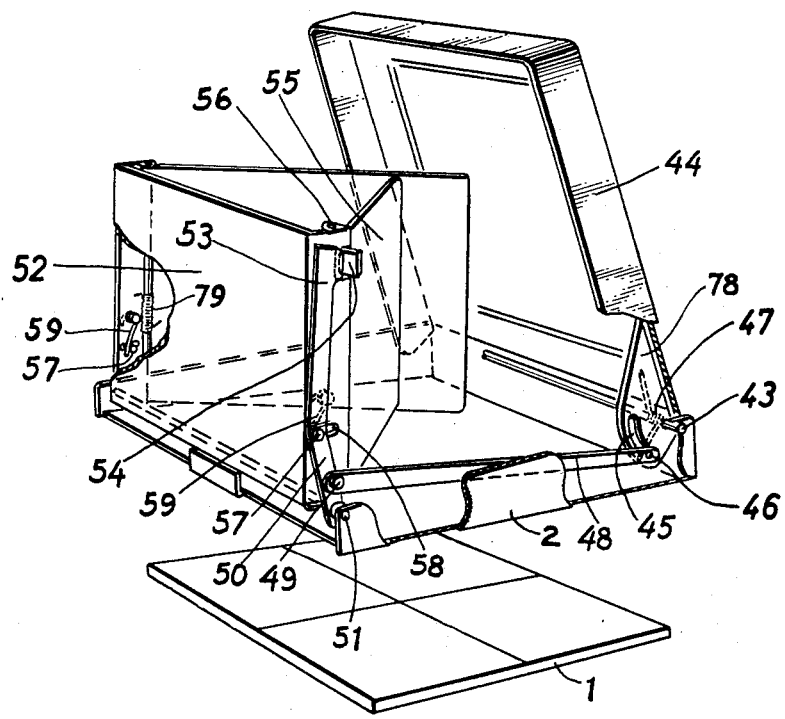
Fig. 5 is a perspective view of still another embodiment of the invention illustrating the parts in a partially collapsed position.

The embodiment of the invention shown in Fig. 5, incorporates many of the principles described above into a different construction in which the side walls of the focusing hood are hinged to the rear wall than to the stationary frame, and fold over each other against the inside surface of the rear wall.

As in the structures previously described, the front wall 44 is pivotally mounted on the forward end of the rectangular frame 2 of the focusing hood by a pivot or hinge rod or bar 43, while the rear wall 52 is likewise mounted on the rear portion of the frame 2 by a pivot or hinge rod or bar 51. The front wall 44 is here again provided with an approximately right angle flange extending around three of its edges, with similar flanges being formed on the side edges of the rear wall. Suitable "dead-center" springs are also employed in this form of the invention to maintain the front and rear walls in their open or closed positions. A pair of links or thrust bars 48 are employed to transmit motion between the front and rear walls. Only one of such links or thrust bars 48 is shown on the drawing for the sake of clarity and simplicity, it being understood that a thrust bar is positioned alongside of each side wall 55 and that both thrust bars function in a similar manner. However, in this construction the thrust bars are provided, at their forward ends, with laterally extending pins 46 which ride along the arcuate grooves or slots 45 formed in the separate lugs or projections 78 depending from and mounted on the forward corners of the front walls. The grooves 45 are concentric with the axis of the rod 43, and the pins 46 are under the influence of springs 47 carried by pivot rod 43, which tend to keep the pins at those ends of the slots which are the lower ends when the front wall is erect or the forward ends when the front wall is collapsed.

The rear ends of the thrust rods 48 are not connected directly to the rear wall 52, but instead are pivotally secured by the studs 49 to intermediate angular levers or links 50, having their lower ends rotatably mounted on the hinge pin 51 of the rear wall. On the free ends of the levers 50 are provided enlarged or nose portions 53 which bear against the laterally projecting ears or lugs 54, formed either as integral extensions of the side walls 55 or as separate parts adjustably secured thereto. The side walls of the focusing hood are pivotally mounted on the side edges of the rear wall 52 by pivot or hinge rods or bars 56 and are each urged into an expanded or outward position by coiled springs 79 carried by the rods 56.

In between the ends of the levers 50 are provided pins or studs 57 which project laterally into the slots 58 formed in the side flanges of the rear wall 52. Springs 59, supported on studs projecting laterally from the side flanges of the rear wall 52 as shown, constantly tend to urge the pins 57 forwardly along the slots 58 and thus help to maintain the parts in expanded or operative position.

In use, this form of focusing hood is moved into a collapsed position by swinging the front wall 44 rearwardly about its pivot rod 43, which effects a forward pull on the thrust rods 48. The pins 46 of the thrust rods 48 are at this time held at the lower ends of the slots 45 by the springs 47, and thus the beginning of downward swinging of the front wall 44 immediately exert a forward pull on the rods 48, which rocks the intermediate levers 50 forwardly about the pivot rod 51, causing their enlarged portions 53 to engage with the lugs 54 and move the side walls 55 toward a folded position as shown in Fig. 5. It will be noted that the initial rocking movement of the levers 50 imparts no motion to the rear wall 52 since the pins 57 merely slide forwardly along the slots 58 until the side walls 55 approach or are in a folded position. Upon reaching the forward ends of the slots 58, the pins 57 then exert a forward pull on the rear wall 52 as the front wall continues its rearward movement, thereby folding it over the focusing screen 1 after the side walls 55 are in collapsed position over each other. By making the lugs 54 adjustable relative to their respective side walls 55, the user may easily set the lugs so that one of the side walls commences its closing movement prior to the other, thus insuring that no interference results therebetween.

As with the modifications of inventions heretofore described, the continued rearward movement of the front wall 44 causes the springs 47 to flex as the rear wall 52 reaches its collapsed location, thus allowing the pins 46 to move relative to the slots 45 as the front wall 44 moves into a covering or horizontal position over the rear wall. The sequence of movements just described with regard to the structure shown in Fig. 5 is merely reversed when the front wall 44 is raised to effect expansion of the focusing hood for use.

Figure 6:
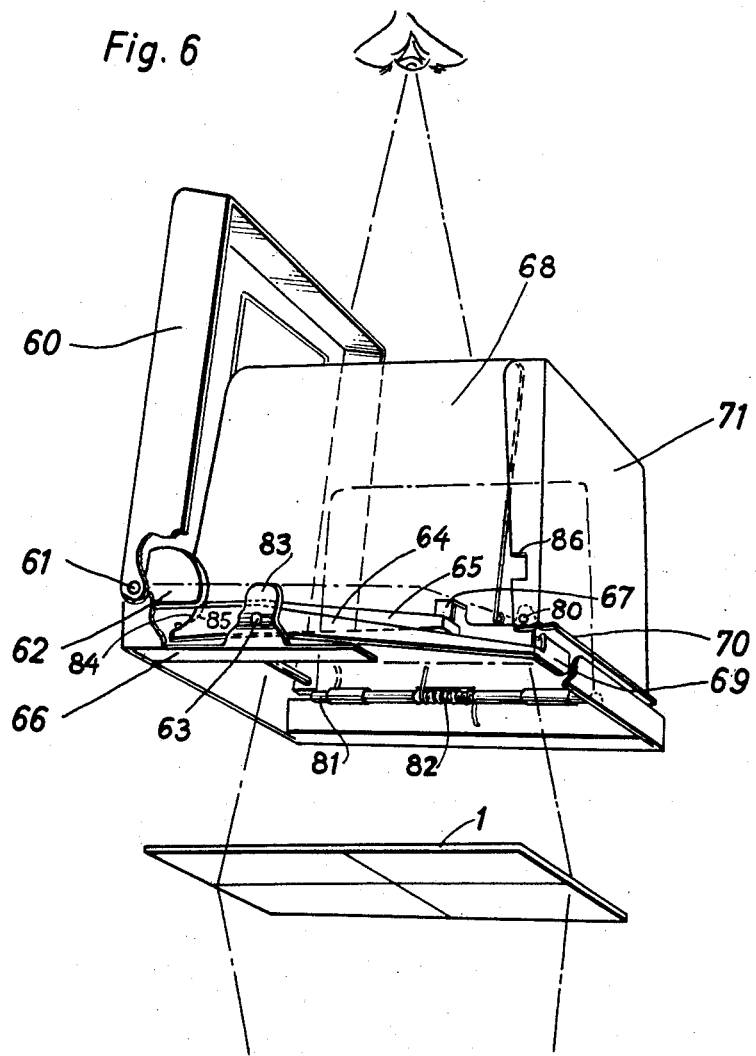
Fig. 6 is a perspective view of still another embodiment of a focusing hood positioned for use.

The embodiment of the invention shown in Fig. 6 compares, in general, with the structures shown in Figs. 1–4 in that the side walls of the focusing hood are hinged to the stationary frame and fold directly over the ground glass focusing screen, rather than being hinged to the rear wall as shown in Fig. 5. However, in this form of the invention the means for effecting the collapsing and expanding of the various walls of the focusing hood, although still controlled by the front wall, are markedly different from those previously described.

As shown in Fig. 6, the hood includes a front wall 60 pivotally secured by the hinge or pivot bar or rod 61 to the top forward portion of the rectangular frame 66, which corresponds to the frame 2 of the previous structure described, and this front wall is provided as before with a rearwardly extending flange along three of its side edges. The rear wall 71 is also similar to those heretofore described in that it is pivotally mounted on the rear portion of the frame 66 by a hinge or pivot rod or bar 80, and is formed with a forwardly directed flange along opposite side edges. Springs, of the "dead-center" type (not shown) are also employed with this construction for maintaining the front wall in its open and closed positions, as in the case of the structures shown in Figs. 1–5, but the spring (not shown) of the rear wall 71 constantly tends to hold it in open or erect position. The side walls 68 of this embodiment of the hood are also pivotally mounted on the opposite side portions of the base frame 66 by hinge or pivot rods or bars 81, and are constantly urged into an erect or expanded position by the springs 82 wound about the pivot rods 81 with their ends engaging the frame 66 and their respective side walls.

As partially shown in Fig. 6, the side portions of the base frame 66 are each provided with outwardly and upwardly extending flange portions 83 to each of which are pivotally secured, as by the pins 63, a pair of hooks or lever arms 64 and 65, disposed approximately parallel to each other and to the side portions of the frame 66. For the sake of clarity and simplicity, only one set of these links 64 and 65 have been shown on the drawing, it being understood that a similar arrangement is provided on the opposite side of the hood. The rear ends 69 of the lever arms 64 are bent at approximately right angles to their main portion to lie below and parallel to the rear wall 71 of the hood, and are adapted to engage with an abutment lip 70 extending rearwardly from the lower portion of the rear wall 71. This abutment lip 70 may be formed as an integral part of the rear wall 71, as shown in Fig. 6, but it is preferred to form the lip as a separate part movably secured to the rear wall to facilitate adjustment. The forward ends of the lever arms 64 are each formed with an arcuate cam follower surface 84 which is adapted to cooperate with an adjacent camming lug or ear 62, approximately in the shape of a quadrant sector, depending from the inside surface of the front wall 60, to effect a closing of the rear wall as hereinafter described.

The lever arms 65, on the other hand, have their rear ends bent toward each other, at approximately right angles to the body portions of the arms, and are adapted to engage with the abutment ears or lugs 67 projecting outwardly from the side walls 68. Here again, the lugs 67 may be formed as struck-out members as shown in Fig. 6, but it is considered desirable to form these lugs as independent elements movably secured to the side walls. In this manner, the user is free to adjust the lugs when needed to insure that the side walls will close in a certain sequence and will not interfere with each other. The front ends of the lever arms 65 are also formed with arcuate cam follower surfaces 85 (shown in broken lines) which are adapted to be engaged by the camming lugs 62 for moving the side walls 68 into collapsed position over the viewing screen 1. It will be noted, however, that in the normal erected position of the parts, the cam follower surface 85 on the lever 65 is at a higher elevation than the follower surface 84 on the lever 64. When the front wall 60 begins to fold downwardly, the corner of the cam 62 will first engage the lever 65 and swing it so as to raise the rear end of the lever to close the side wall 68. Then, while the arcuate part of the cam 62 slides over the part 85 to maintain the lever 65 in its fully actuated position, the advancing corner of the cam will engage the other lever 64 and swing it to raise its rear end to fold the rear wall 71 down on top of the already collapsed side walls 68, completing the folding of the rear wall just before the front wall 60 completes its own downward folding movement. At completion of folding, the arcuate surfaces 84 and 85 of the levers are snugly engaged with and retained by the correspondingly curved arcuate surface of the cam 62.

In addition to the adjustable parts thus far described, the pivot pins 63 are preferably formed with eccentric shafts in order that the operating levers may be adjusted relative to the cams 62, to maintain the proper sequence of the movements of the parts even after some degree of wear of the parts has occurred. Further, to permit the rear wall 71 to close fully, suitable cut-outs, as shown at 86, are provided in the flanges of the rear wall, into which the lugs 67 of the side walls are adapted to seat when the hood is collapsed.

As with the previously described embodiments, operation of this form of the focusing hood is accomplished by movement of the front wall 60, as will be apparent from the preceding description of the parts. The closing movement has already been explained in detail. The opening or expansion of the parts of the hood into "ready" or operative position is accomplished by swinging of the front wall upwardly about its pivot, resulting in movements in reverse direction and reverse sequence to those already described.

While the various modifications of the invention described above differ in the manner in which movement is transmitted from the front wall to the rear and side walls, the means for accomplishing these concomitant movements in each of the structures described may be termed a lost-motion transmitting means. In each of the structures presented the initial movement of the front wall effects a collapsing of the side walls, either to a position over the viewing screen (Figs. 1–4 and 6) or parallel to the rear wall (Fig. 5), while the terminal movement of the front wall draws the rear wall into a flat position, in which it is covered by the front wall; thus there is "lost motion" between the front wall and the rear wall, although the latter is operatively connected to the former. Also, the term "linkage means" and similar expressions are intended to refer to the interconnecting operating parts in all forms of the invention, for even in Fig. 6 the cam 62 and levers 64 and 65 serve to "link" the rear and side walls operatively to the front wall, even though there are no push or pull rods as in the other embodiments.

The various hoods described have their walls effectively connected to each other so that movement of one wall causes the others to react, in all of the disclosed forms of the invention. In this manner the walls of the hood may be collapsed into a compact unit on top of the camera housing with none of the parts entering into the housing itself. Further, the connection between the various walls requires no auxiliary locks or stops to hold the individual walls in erect position when the hood is employed in windy areas.

The directional or orienting terms "front wall," "rear wall," etc., are employed purely for convenience of description. Obviously the hood may be mounted in any desired position on the camera, and the one wall which controls the movements of the other walls could equally well be at the rear, at the side, or at any other preferred position of orientation.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A flat-folding collapsible focusing hood for a photographic camera, said hood comprising a substantially rectangular horizontal frame, a front wall and a rear wall each pivoted near its lower edge to said frame to swing from an upstanding approximately vertical position to a collapsed approximately horizontal position in which the front wall overlies the collapsed rear wall, two side walls each mounted for swinging movement about a pivotal axis substantially perpendicular to the pivotal axis of the rear wall from a normal upstanding position to a collapsed position underlying the collapsed rear wall, means including a pair of levers operated by initial downward folding movement of the front wall for swinging said two side walls from their normal upstanding position to a different position without causing substantial movement of said rear wall, said pair of levers being pivoted on fixed pivots on said frame for oscillating movement thereon and being confined against movement other than said oscillating movement, and means including a third lever pivoted for oscillation on one of the same pivots on which said pair of levers are pivoted and operated by subsequent downward folding movement of the front wall for folding said rear wall downwardly and forwardly to assume a terminal collapsed position overlying the collapsed side walls and underlying the front wall in its terminal collapsed position.

2. A flat-folding collapsible hood structure for a photographic camera, said hood structure comprising a substantially rectangular horizontal frame, a front wall, a rear wall, and two side walls all hinged at their respective lower edges to four respective sides of said frame to swing from a substantially vertical erected position to a substantially horizontal collapsed position in which one of the side walls overlaps the other, the rear wall overlies both of the side walls, and the front wall overlies the rear wall and constitutes a cover for the collapsed assembly, erecting springs tending to swing said side and rear walls upwardly from their respective collapsed positions to their respective erected positions, a pair of side wall operating levers pivoted to opposite sides of said frame outside of said side walls, a lateral extension on each side wall engaging one of said levers, a rear wall operating lever pivoted to one side of said frame, an extension on said rear wall engaging said rear wall operating lever, and a plurality of cams fixed to and moving with said front wall for engaging all of said levers as said front wall swings rearwardly and downwardly from its erected position toward its collapsed position, to move said levers first to press against said lateral extensions on said side walls to swing said side walls inwardly and downwardly against the force of their respective erecting springs and then to press against said extension on said rear wall to swing said rear wall forwardly and downwardly against the force of its erecting spring.

3. A flat-folding collapsible hood structure for a photographic camera, of the type including a substantially rectangular horizontal frame, a front wall, a rear wall, and two side walls all hinged substantially at their respective lower edges to four respective sides of said frame to swing from a substantially vertical erected position to a substantially horizontal collapsed position in which one of the side walls overlaps the other, the rear wall overlies both of the side walls, and the front wall overlies the rear wall, and an erecting spring operatively connected to each of said rear walls and two side walls to tend to swing each of such walls upwardly from their respective collapsed positions to their respective erected positions, characterized by the provision of a first side wall operating lever, a second side wall operating lever, a rear wall operating lever, each of said levers being pivoted intermediate its ends on said frame for pivotal swinging movement relative to said frame and each having a front end portion near said front wall and a rear end portion engaging a portion on its respective wall offset horizontally from the hinge of its respective wall, and cam means connected to and moving with said front wall to engage and swing said levers in sequence when said front wall swings from its erected position toward its collapsed position, to swing the first and second side walls and the rear wall in sequence from their respective erected positions to there respective collapsed positions against the force of their respective erecting springs.

References Cited in the file of this patent

UNITED STATES PATENTS

| 2,495,355 | Stahl | Jan. 24, 1950 |
| 2,640,388 | Shapiro | June 2, 1953 |

FOREIGN PATENTS

| 13,603 | Great Britain | 1897 |
| 122,499 | Sweden | Aug. 17, 1948 |